United States Patent Office 3,267,053
Patented August 16, 1966

3,267,053
PHENOL-FORMALDEHYDE RESIN COMPOSITIONS
Floyd B. Nagle and Elmer L. McMaster, Midland, Mich., assignors to The Dow Chemical Company, Midland, Mich., a corporation of Delaware
No Drawing. Filed Aug. 8, 1962, Ser. No. 215,526
10 Claims. (Cl. 260—17.2)

This invention relates to an improved phenol-formaldehyde resin composition and a process for preparing the same. It relates more particularly to a phenol-formaldehyde resin composition which forms a long-lasting continuously adherent protective coating for fibrous cellulosic materials such as hardboard and the like.

Much difficulty has been encountered in the fabrication of articles such as insulating panels formed from expanded polystyrene and like foamed plastic cores and cellulosic face sheets such as hardboard and the like. Such panels have been fabricated by adhering the cellulosic face sheet to the foamed plastic core with a wide variety of adhesives. However, the limitations of the adhesive systems employed frequently cause much difficulty and result in the necessity of employing complicated techniques which require an extended period of time for the adhesive to cure and bond the cellulosic facing sheet to the polystyrene core. An adhesive used in the fabrication of such panels or other structures ideally must be water-resistant and should be a relatively free-flowing liquid in order to facilitate application thereof. Further, the adhesive must not chemically attack the fibrous cellulosic material. Ideally, the adesive should set quickly at ambient temperatures and not require any external application of heat. The adhesive employed should be relatively low in cost and be able to withstand extended periods of weathering. For these reasons, it has been found beneficial to employ acid catalyzed phenolic formaldehyde resins for such application.

When such resins are applied to cellulosic materials such as hardboard and the like, water associated with the resin i.e. water of reaction and catalyst solution, permeates the cellulosic material leaving the water insoluble phenolic formaldehyde resin behind. As a result, a high surface tension is created between the water impregnated cellulosic material and the phenolic formaldehyde resin, which often produces a random and irreproducible separation of such resin from the cellulosic material, with accompanying diminution of bonding and protective coating properties.

It is an object of this invention to provide an acid catalyzed phenolic formaldehyde resin composition which forms a long-lasting continuously adherent protective coating for cellulosic facing sheets such as hardboard and the like.

The benefits in accordance with the invention are achieved by a composition comprising: (1) a liquid, water-insoluble condensation product of phenol and formaldehyde, which condensation product is in amount sufficient, when hardened, to set the entire composition into a rigid, solid mass, (2) up to about 15 weight percent based on the total weight of the composition of an acidic hardening agent such as trichloracetic acid, isopropyl paratoluene sulfonate, benzene sulphonyl chloride and paratoluene sulfonic acid and mixtures thereof, and (3) between about 0.05 and 3 weight percent of sorbitan trioleate based on the entire weight of the composition.

With regard to the phenolic formaldehyde resin composition utilized in the practice of the invention, thermosetting phenol-formaldehyde resins in a water-insoluble liquid state are generally employed. In general, such resins are prepared by condensation of one molecular equivalent of a monohydric phenol, which is unsubstituted in at least one of the 2, 4 and 6 positions of the benzene nucleus, with between 1 and 2.5, preferably between 1.40 and 1.5, molecular equivalents of formaldehyde, and discontinuing the condensation reaction when the product becomes water-insoluble, but remains liquid. Procedures for making such liquid phenol-formaldehyde condensation products are well known and need not be given in detail. In order to prepare a suitable adhesive composition, the condensation reaction is started under alkaline conditions, e.g. using from 1 to 2 percent by weight of sodium hydroxide, potassium hydroxide, sodium carbonate, or other alkali as catalyst and carried out at temperatures in the order of from 40° C. to 70° C. to a point at which the product is a fairly thin, water-soluble liquid. The mixture is acidified by adding a strong aqueous mineral acid such as hydrochloric or sulphuric acid, etc., and the reaction is continued at similar temperatures until the mixture becomes fairly viscous and is water-insoluble. The reaction is preferably stopped short of the solidification point, since the liquid resin is more conveniently used than is the solid thermoplastic state of the resin, but the solid state of the resin can be used if dissolved in a suitable solvent. It is essential that the phenol-formaldehyde condensation reaction be carried to a point at which the product is substantially water-insoluble (although said product itself may have from 20 to 35 percent of water dissolved in it) since the water-soluble liquid condensation products formed in the earlier stages of the phenol-formaldehyde condensation reaction usually harden to form porous products when used directly as the adhesive.

After carrying the phenol-formaldehyde condensation reaction out in the presence of an acid to a point at which the product is a water-insoluble liquid, the mixture is neutralized, e.g., with aqueous ammonia, NaOH, KOH, $Na_2CO_3$ or $K_2CO_3$, etc., and washed thoroughly with water. It usually then retains from 20 to 35 percent by weight of dissolved water. In most instances, such condensation product of phenol and formaldehyde has a viscosity of from 300 to 400 centipoises at 25° C. but it may be of lower or higher viscosity. If desired, it may be heated, preferably under vacuum, to remove part or all of the water prior to use in the invention.

The liquid, water-insoluble phenol-formaldehyde resin is subsequently treated directly with (1) up to about 15 percent by weight of at least one acidic hardening agent, exemplary of which are paratoluene sulphonic acid, trichloroacetic acid, isopropyl paratoluene sulphonate, and benzene sulphonyl chloride, based on the entire weight of the composition and (2) from 0.05 to 3 weight percent of sorbitan trioleate based on the entire weight of the composition to obtain a coating composition which may be applied as a film to solid members such as plywood, hardwood, etc., and which hardens quite rapidly at ordinary or elevated temperatures, e.g., at temperatures between 10° C. and 60° C. or above, to form water-impermeable, long-lasting, continuously adherent protective coatings. The expressed amounts of acidic hardening agents and sorbitan trioleate may be added to the liquid phenol-formaldehyde resin in any desired sequential order, by any conventional method. Thus, such materials may be added directly or in aqueous or solvent dispersion to the liquid phenol-formaldehyde resin. If desired, the resin may be diluted with a water miscible solvent such as ethyl alcohol, butyl alcohol, ethylene glycol, propylene glycol, or a mixture of such solvents, to bring it to a viscosity best suited for application, e.g., by brushing, dipping, spraying, prior to addition of the acid catalyst and sorbitan trioleate.

Generally, it is desirable to apply the phenolic formaldehyde resin composition of the present invention to the cellulosic material by spraying the resin onto the cellulosic material. In this manner, the minimum quantity of resin is utilized. This operation is readily carried out at room temperature.

In the practice of the invention, fibrous cellulosic materials which may be advantageously coated with the phenolic formaldehyde resin composition described herein include such materials as wood veneer, plywood, edge glued boards, chipboard, particleboard, and the like. Beneficially, for many applications, a cellulosic fiberboard is often employed where a grainless outer surface is desired. Typical of such cellulosic fibrous boards are those available under the trade designation "Masonite," such fibrous boards or sheets comprise cellulosic wood fibers bonded together and frequently impregnated with a drying oil to result in a product known as tempered hardboard.

Fibrous cellulosic materials coated with the phenolic formaldehyde resin compositions in accordance with the present invention show no deterioration of the bonding strength over long periods of time. Additionally, chemical attack or deterioration of the cellulosic material due to the presence of the acid catalyzed phenolic resin containing the expressed amounts of sorbitan trioleate is totally absent.

The following example wherein all parts and percentages are to be taken by weight serves to illustrate the present invention but is not to be construed as limiting its scope.

*Example 1*

In each of a series of experiments a mixture of 44.5 parts by weight of phenol, 55.5 parts of an aqueous formaldehyde solution of 37 weight percent concentration and 1.5 parts of sodium hydroxide was reacted at 60° C. for 6 hours. At this stage of the reaction, the liquid condensation products were water-soluble. Each of the mixtures were then individually acidified by addition of 35 cc. of aqueous sulphuric acid of 30 percent concentration, per pound of the mixture to which the acid was added. Each acidified mixture was separately agitated while warmed to about 40° C. for from 2 to 3 hours. The aqueous and organic layers of each of the mixtures were separated and the organic layers washed thoroughly with water. Each of the water-insoluble liquid phenol-formaldehyde products thus obtained, retained from 20 to 35 percent of water dissolved therein. Each of the water-insoluble phenol-formaldehyde products was mixed with 10 percent by weight of paratoluene sulfonic acid and from 0.05 to 1 percent by weight of sorbitan trioleate based on the weight of the total mixture. A layer of each of the so-formed phenol-formaldehyde resin composition was individually applied to a tempered hardboard panel using a spatula for spreading the resin. Each of the coated hardboard test samples was allowed to set for 5 minutes at room temperature and was then visually rated for surface separation. At the end of this period each of the phenol-formaldehyde resin compositions was firmly bonded to the hardboard test panel, with no evidence of surface separation.

Similar good results were obtained wherein the paratoluene sulfonic acid catalyst constituent of the phenol-formaldehyde resin composition is replaced by up to about 15 weight percent based on the total weight of the composition of at least one of the following acid catalysts; trichloroacetic acid, isopropyl paratoluene sulphonate and benzene sulphonyl chloride. Additionally, similar good results are obtained when the sorbitan trioleate is used in amounts between about 0.05 and 3 weight percent based on the entire weight of the composition.

For comparative purposes a hardboard panel was similarly coated with an acid catalyzed phenol-formaldehyde resin as described herein, but to which no sorbitan trioleate was added. This test sample was characterized by very noticeable areas of surface separation after 5 minutes of set time at room temperature.

For further comparative purposes in each of a series of experiments individual hardboard panels were similarly coated with a paratoluene sulfonic acid catalyzed phenol-formaldehyde resin as described herein, in which the sorbitan trioleate was replaced by equivalent amounts of one of a series of commercially prepared nonionic, cationic and anionic surfactants, including: Tween 20, a polyoxyethylene sorbitan monolaurate; Tween 80, a polyoxyethylene sorbitan monooleate; the dihexyl ester of sodium sulfosuccinic acid; Igepal CO-710, nonylphenoxypoly(ethyleneoxy) ethanol; Daxad 30, a sodium salt of a polyelectrolyte; Alkaterge T, substituted oxazoline; among many others. In all instances each test sample was characterized by very noticeable areas of surface separation after 5 minutes of set time at room temperature.

What is claimed is:

1. A cured composition comprising (1) a liquid, water-insoluble condensation product of phenol and formaldehyde, which condensation product is in amount sufficient, when hardened, to set the entire composition into a rigid solid mass, (2) up to about 15 weight percent based on the entire weight of the composition of an acidic hardening agent for said liquid, water-insoluble condensation product and (3) between about 0.05 and 3 weight percent based on the entire weight of the composition of sorbitan trioleate.

2. The composition of claim 1, wherein said acidic hardening agent is paratoluene sulfonic acid.

3. The composition of claim 1, wherein said acidic hardening agent is trichloroacetic acid.

4. The composition of claim 1, wherein said acidic hardening agent is isopropyl paratoluene sulphonate.

5. The composition of claim 1, wherein said acidic hardening agent is benzene sulphonyl chloride.

6. In a method of preparing a thermo-setting phenol-aldehyde resin coating composition for fibrous cellulosic sheet, the improvement which comprises utilizing an acid catalyzed phenol-formaldehyde resin prepared by (1) condensing one molecular equivalent of a monohydric phenol which is unsubstituted in at least one of the 2, 4, and 6 positions of the benzene nucleus with between 1 and 2½ molecular equivalents of formaldehyde, such condensation occurring in an alkaline medium at a temperature of about 40 to 70° C., (2) acidifying the reaction mixture by adding a strong aqueous mineral acid at a point where the product is a thin, water-soluble liquid, (3) continuing the reaction at a temperature of between 40° C. and 70° C. until the mixture becomes viscous and is water insoluble, (4) separating the water-insoluble acidified phenol-formaldehyde condensation product from the reaction mixture, (5) subsequently neutralizing by the addition of an alkali material, (6) washing said condensate with water, (7) subsequently mixing to at least a portion of said condensate with from up to about 15 percent of an acidic hardening agent and from 0.05 to 3 weight percent of sorbitan trioleate, based on the entire weight of the composition.

7. The method of claim 6, wherein said acidic hardening agent is paratoluene sulfonic acid.

8. The method of claim 6, wherein said acidic hardening agent is trichloroacetic acid.

9. The method of claim 6, wherein said acidic hardening agent is isopropyl paratoluene sulphonate.

10. The method of claim 6, wherein said acidic hardening agent is benzene sulphonyl chloride.

References Cited by the Examiner

UNITED STATES PATENTS

| | | | |
|---|---|---|---|
| 2,485,592 | 10/1949 | Griess et al. | 260—31.6 |
| 2,666,038 | 1/1954 | Eisen | 260—31.6 |
| 2,839,434 | 6/1958 | Haughney et al. | 260—19 |
| 2,843,566 | 7/1958 | Christenson et al. | 260—19 |
| 2,871,208 | 1/1959 | Christenson et al. | 260—19 |

LEON J. BERCOVITZ, *Primary Examiner.*

JAMES A. SEIDLECK, *Examiner.*

R. W. GRIFFIN, C. W. IVY, *Assistant Examiners.*